Feb. 6, 1945. C. S. ROBINSON 2,368,727
DUPLEX VIBRATION ABSORPTION MOUNT
Filed Sept. 11, 1943 2 Sheets-Sheet 1
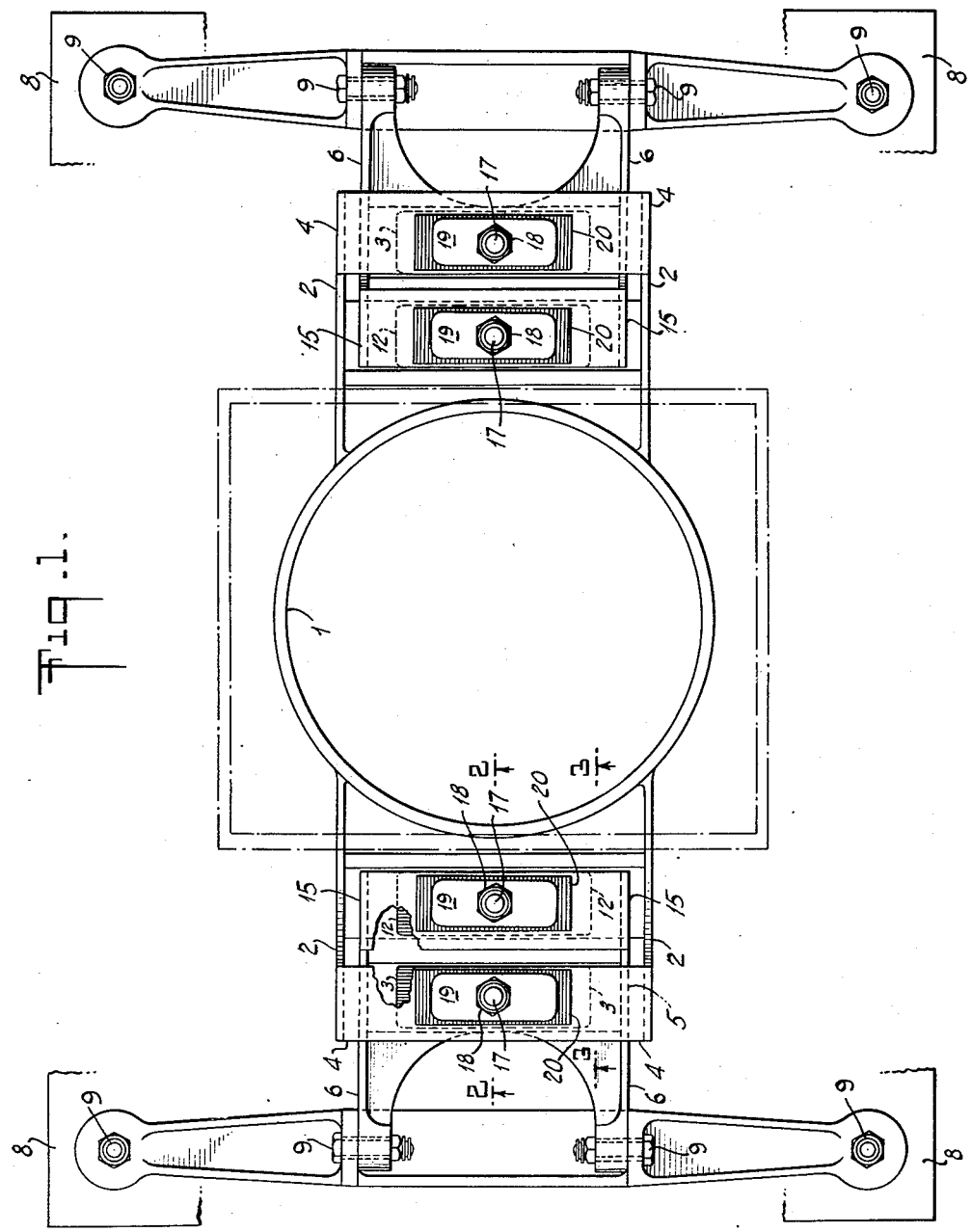
INVENTOR
CECIL S. ROBINSON.
BY
ATTORNEY

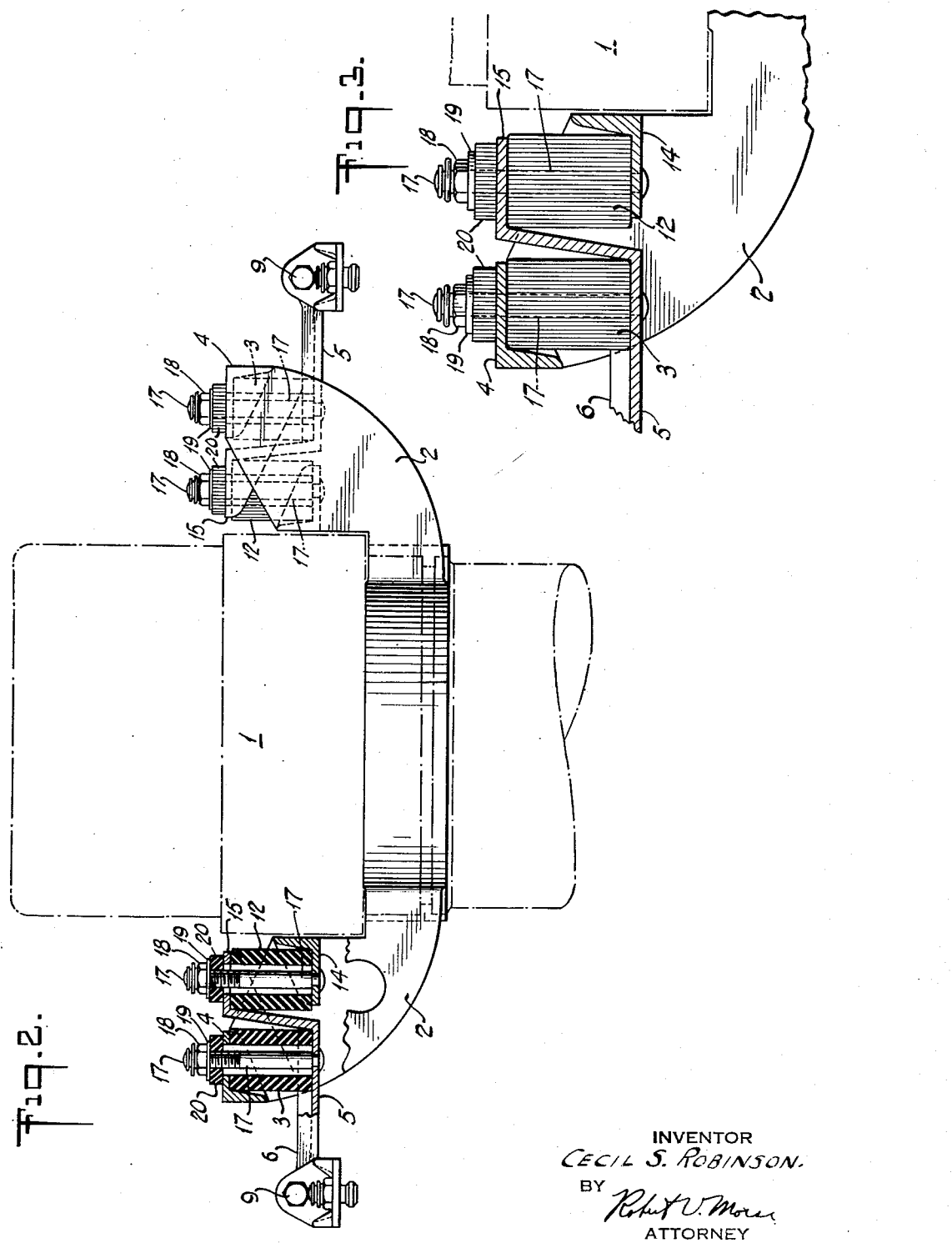

Patented Feb. 6, 1945

2,368,727

UNITED STATES PATENT OFFICE 2,368,727

DUPLEX VIBRATION ABSORPTION MOUNT

Cecil S. Robinson, New York, N. Y.

Application September 11, 1943, Serial No. 501,945

8 Claims. (Cl. 248—358)

This invention relates to the absorption of vibration in the mounting of apparatus, particularly the higher orders of visible and invisible sustained vibrations which frequently impare the usefulness of expensive instruments. Where the practical elimination of continuous vibrations is required, as in mounting optical, electrical or scientific apparatus in airplanes for example, the problem of absorption of the various frequencies is complicated by limitations of space. The peculiar properties of cushioning materials must be considered in attaining any high degree of success in absorbing such vibrations; and it is sometimes difficult to reconcile the various conflicting factors affecting a given problem.

In an airplane the whole supporting structure is subject to continuous visible and invisible vibrations of variable and mixed characteristics. These vibrations are readily transmitted where there are rigid or metallic paths or contacts, but may be absorbed in varying degrees by cushioning materials such as felt, rubber or synthetics. However, the most useful materials of rubber-like characteristics exhibit their best properties only in certain ranges of unit loading and deflection, and otherwise transmit considerable vibration if too rigid, or may even create additional harmonic vibration if too elastic. The proper loading of the cushioning material is highly important in attaining good results, and such unit loading is not always compatible with the restrictions of space and amplitude imposed by the problem. A soft action for example cannot be satisfactorily built up by mere addition of more rubber without the danger of building up harmonic vibrations within the rubber itself. Such considerations create problems requiring a more complicated solution, particularly when space is limited or unusual amplitudes are present.

The present invention is directed to the solution of particular problems of that character, with a view to providing a highly absorbent or soft action having considerable amplitude, without stressing the cushioning materials beyond their most effective absorbing range, so as to maintain functional stability and avoid harmonics. Another object is to avoid or eliminate any hard or metallic contact, so as to leave no such path for the transmission of vibrations. Further objects will become apparent as the description proceeds.

Referring now to the drawings forming part of this specification,

Fig. 1 is a plan view of a typical installation, as applied to a camera mount in an airplane.

Fig. 2 is an elevation view, with one side a cross-section on the line 2—2 of Fig. 1.

Fig. 3 is a detail cross-section on a larger scale taken on the line 3—3 of Fig. 1.

Similar reference numerals refer to similar parts thruout the various views.

Referring first to Fig. 1 and Fig. 2, the camera 1 or other object to be supported and protected from vibration is carried in the arms 2 which extend outward from the two sides and rest on the elastic cushions 3 by means of the supporting flanges 4. The flanges 4 are integral with the arms 2. The elastic cushions 3 are in turn supported by the flanges 5 which are part of the brackets 6. These brackets 6 are generally fixed in relation to the main body 8 of the airplane or other vibrating foundation structure, though it is desirable that the attaching bolts 9 be also provided with rubber bushings for further insulation against vibration.

We are here particularly concerned with the linkage between the moving arms 2 and the fixed bracket 6 by means of which a soft or wide amplitude of vibration is absorbed with a relatively small distortion of the elastic cushions so as to preserve their efficiency. It is also essential to eliminate all metal to metal contacts thru which vibrations might be transmitted. Since the cushioning device is similar in its application to the various sides, and is shown on a larger scale in Fig. 3, it may be convenient at the time to refer to that figure, though often the linkage on one side of the supported object is compressed when the other is extended.

Referring now to Fig. 2 and Fig. 3, it will be seen that in addition to the elastic cushions 3 above described on which the vertical load normally rests, each supporting linkage has another cushion 12 placed in a kinematically reversed relation to the cushion 3; that is, the arm 2 is provided with a flange 14 which bears against the bottom of the cushion 12, whereas the other flange 4 of that arm 2 rests on the top of the cushion 3. And on the other hand, the bracket 6 is provided with a flange 15 bearing on the top of the cushion 12, whereas the other flange 5 of that bracket supports the bottom of the cushion 3. The effect is somewhat similar to a cross-linkage having a pivot between the two cushions, but is important to note that any fixed pivot is entirely omitted. There is thus no metallic path by way of which vibrations could travel thru the system. Any vibrations present must travel thru both cushions. The flexible linkage permits a multiplication of amplitude relative to the cushions so as to give a soft action.

The cushions are held in place by thru bolts 17 in suitable openings in the cushions, the lower ends of the bolts being secured to the flanges 5 or 14. These bolts are provided with adjustable nuts 18 bearing on the pressure plates 19, which rest on suplementary elastic cushions 20. These supplementary cushions 20 being interposed between the adjustable pressure plates 19 and the flanges 4 and 15 prevent any hard or metallic contact so that the vibrations cannot find such a path by way of the bolts. The nuts 18 and pressure plates 19 also provide a convenient means for adjusting the initial pressure on the cushioning elements so that the mounted apparatus may be securely held and the degree of flexibility or rigidity may be regulated.

In the example illustrated in Fig. 1 and Fig. 2 two sets of these flexible linkages are sufficient to support the apparatus, but it will be understood that with heavier loads three, four or any desired number may be applied at various points according to the structure, which in some cases might have a very large number. On the other hand, in other cases a single unit may be sufficient. A pair of the devices has been found to be satisfactory in most cases, including structures having torsional or angular vibration, such as airplanes.

The cushions 3 and 12 with their pressure plates 19 are extended in a direction at right angles to the plane of motion of the compound linkage above described, each cushion acting as though it were a pair of end cushions separated by the bolt 17, since the material near the center is relatively ineffective in the motions to be now mentioned, and indeed might be omitted so as to leave two separate cushions. These long cushions or pairs permit controlled oscillations or vibration dampening in a second plane at right angles to the primary plane of oscillation first described. Since these long spaced cushions stabilize the mount elastically in another direction at right angles to the plane of motion of the linkage, vibrations can be absorbed in all four directions even though mounted on only one pair of units.

Returning now the principal motions first considered, the effect of the duplex cushions of each unit being somewhat in the nature of a linkage, or a compound leverage with an intermediate imaginary pivot or fulcrum, an extended relative movement of the ends of the levers or brackets is permitted with a relatively small distortion of the elastic cushioning elements. This permits the engineer working on a particular installation to use a selected range of compression at which the particular cushioning material is most efficient as an absorber of vibrations of the characteristics encountered. This latitude in controlling the specific loading of the elastic materials is very useful in obtaining satisfactory results, since vibration problems vary greatly in character of vibration, intensity and amplitude. The freedom from any metallic pivots or contacts also provides a permanently quiet and effective installation and one in which there are no bearings requiring lubrication.

Any vibration absorbing material may be used for the cushions, such as sponge rubber, solid rubber of suitable characteristics, felt, fabric, and synthetic materials such as the rubber substitutes.

While I have in the foregoing described certain specific forms by way of example, it will be understood that they are merely for purposes of illustration to make clear the principles of the invention, which is not limited to the particular forms shown, but is susceptible to various modifications and adaptations in different installations as will be apparent to those skilled in the art, without departing from the scope of the invention as stated in the following claims.

1. A vibration absorption unit comprising in combination a supporting bracket having a seat and an extension having a cap, a supported bracket having a seat and an extension having a cap, an elastic cushion between the first mentioned seat and the second mentioned cap, a second elastic cushion between the second mentioned seat and the first mentioned cap, the two extensions crossing each other as projected on the principal plane of vibration so as to provide the substantial equivalent of a free pivot without actual contact, whereby a duplex cushioned lever action is obtained.

2. A vibration absorption unit comprising in combination a supporting bracket having a seat and an extension having a cap, a supported bracket having a seat and an extension having a cap, an elastic cushion between the first mentioned seat and the second mentioned cap, a second elastic cushion between the second mentioned seat and the first mentioned cap, said elastic cushions extending transversely to the brackets a greater distance than in the principal plane of vibration, so as to also absorb vibrations in directions transverse thereto, the two extensions crossing each other as projected on the principal plane of vibration so as to provide the substantial equivalent of a free pivot without actual contact, whereby a duplex cushioned lever action is obtained.

3. In a vibration absorbing mount, the combination of a supporting base, a supported object, criss-cross brackets interlinking the object and base but free from contact with each other, elastic cushions on each side of the criss-cross, said cushions forming the connections between the brackets to absorb vibrations, whereby the cushions are located in a duplex leverage system at points of reduced amplitude of vibration.

4. In a vibration absorption unit, the combination of a pair of elastic cushions, a bracket touching the top of the first cushion and the bottom of the second cushion, a second bracket touching the bottom of the first cushion and the top of the second cushion, supplementary cushions on the outer sides of the brackets, pressure plates on said supplementary cushions, and bolts securing said pressure plates and cushions in place.

5. In a vibration absorbing mount, the combination of a supporting base, a supported object, outer brackets attached to the base on different sides of the object, inner brackets attached to the object on sides corresponding to the outer brackets, said inner and outer brackets crossing in operating planes but having a clearance between each other, pairs of elastic cushions for each set of brackets on each side, said cushions arranged on opposite sides of the crossing point, whereby the brackets may act substantially as though pivoted together though without actual pivotal contact.

6. In a vibration absorbing unit a linkage between supporting members including a pair of resilient cushions, means on one supporting member engaging one side of one of said cushions and a different side of the other cushion, and means on another supporting member engaging respectively the opposite side of each of said cushions.

7. In a vibration absorbing unit a pair of fixed attaching brackets arranged and spaced with relation to each other, a separate load supporting member interposed between said brackets, resilient vibration absorbing cushions, said brackets and supporting member each having relatively offset portions respectively contacting the upper surface of one cushion and the lower surface of the other cushion.

8. In a vibration absorbing unit separate cooperative supporting members and resilient vibration absorbing cushions, each of said members having relatively offset extensions respectively contacting the upper surface of one cushion and the lower surface of the other cushion.

CECIL S. ROBINSON.